US008032500B2

(12) United States Patent  
Chouanard et al.

(10) Patent No.: US 8,032,500 B2
(45) Date of Patent: Oct. 4, 2011

(54) DYNAMIC SENDING POLICIES AND CLIENT-SIDE DISASTER RECOVERY MECHANISM FOR MESSAGING COMMUNICATION

(75) Inventors: Jean Chouanard, Redwood City, CA (US); Swee B. Lim, Cupertino, CA (US); Michael J. Wookey, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 1240 days.

(21) Appl. No.: 11/209,306

(22) Filed: Aug. 22, 2005

(65) Prior Publication Data

US 2007/0043581 A1   Feb. 22, 2007

(51) Int. Cl.
*G08C 25/02* (2006.01)
(52) U.S. Cl. ............................ 707/694; 704/18; 704/748
(58) Field of Classification Search .................... 707/694
See application file for complete search history.

(56) References Cited

U.S. PATENT DOCUMENTS

| | | | | |
|---|---|---|---|---|
| 4,754,428 A | * | 6/1988 | Schultz et al. | 709/246 |
| 4,994,926 A | * | 2/1991 | Gordon et al. | 358/400 |
| 5,265,103 A | * | 11/1993 | Brightwell | 714/748 |
| 5,859,966 A | * | 1/1999 | Hayman et al. | 726/23 |
| 6,044,405 A | * | 3/2000 | Driscoll et al. | 709/232 |
| 7,188,292 B2 | * | 3/2007 | Cordina et al. | 714/748 |
| 7,274,908 B1 | * | 9/2007 | Boone et al. | 455/13.2 |
| 7,281,049 B2 | * | 10/2007 | Verma et al. | 709/229 |
| 7,532,340 B2 | * | 5/2009 | Koppich et al. | 358/1.15 |
| 2002/0013853 A1 | * | 1/2002 | Baber et al. | 709/232 |
| 2002/0049767 A1 | * | 4/2002 | Bennett | 707/104.1 |
| 2003/0067630 A1 | * | 4/2003 | Stringham | 358/1.16 |
| 2003/0084105 A1 | * | 5/2003 | Wiley et al. | 709/205 |
| 2003/0200234 A1 | * | 10/2003 | Koppich et al. | 707/203 |
| 2004/0003149 A1 | * | 1/2004 | Engel et al. | 710/54 |
| 2004/0153511 A1 | * | 8/2004 | Maynard et al. | 709/206 |
| 2004/0172586 A1 | * | 9/2004 | Ragnet et al. | 715/500 |
| 2004/0205781 A1 | * | 10/2004 | Hill et al. | 719/328 |
| 2006/0031519 A1 | * | 2/2006 | Helliwell et al. | 709/227 |

* cited by examiner

*Primary Examiner* — Neveen Abel Jalil
*Assistant Examiner* — Daniel Kinsaul
(74) *Attorney, Agent, or Firm* — Osha • Liang LLP

(57) ABSTRACT

A method involving enqueuing, according to a policy associated with an offering, a document in a queue for delivery to a first document endpoint; transmitting the document to the first document endpoint; retaining a copy of the document and marking the copy to indicate transmission of the document; and upon receipt of an indication, unmarking the copy of the document using the processor; and transmitting the copy to a second document endpoint.

13 Claims, 2 Drawing Sheets

DYNAMIC SENDING POLICIES AND CLIENT-SIDE DISASTER RECOVERY MECHANISM FOR MESSAGING COMMUNICATION

FIELD OF THE INVENTION

The present invention relates to methods and systems for restoring documents and/or other electronic information at a remote location in the event of a loss of such information.

BACKGROUND

Disaster recovery or business continuity plans deal with, among other things, the restoration of computer systems, software, network connections, etc. to partial or full functionality following the occurrence of a loss of such systems (usually due to external forces). Where databases are part of such system, the plans must include some means by which the lost data is recovered or restored. Indeed, it is often the data rather than the physical system components which is most critical for a business' operations and so the restoration of that data is often of paramount importance.

Notwithstanding the importance of such data, however, because disaster recovery operations for large data centers and/or large databases are often both complex and costly to implement, businesses are sometimes reluctant to implement disaster recovery mechanisms. The problem is compounded when the data to be safeguarded is changing at a fast rate; the synchronization of the disaster recovery database(s) can require high bandwidth connections and complex synchronization tools.

Even where disaster recovery mechanisms have been implemented, conventional solutions often rely on mass backups of data to tape or other storage medium. These solutions fail to account for differing degrees of importance of individual data items. Consequently, if and when a computer system must be restored from such a backup, meaningful data (e.g., from a standpoint of an application program) cannot be differentiated from less important data and so an entire reload of the database is required. This can add unnecessary time to the restoration process, which could be saved if the data were better segregated or other means of restoring data according to the needs of the application programs requiring the same were followed.

SUMMARY OF THE INVENTION

In accordance with one embodiment of the present invention, one or more documents are restored at a remote data storage location from a local data storage location, the one or more documents having been previously transmitted from the local data storage location to the remote data storage location through a communication system accessible by a number of offerings and according to document delivery customizations for the communication system associated with one of the offerings. Parameters defining those customizations are obtained from a registry associated with the one of the offerings, such registry as may be hosted at the remote data storage location. Prior to so restoring the one or more documents, those documents may be designated as not having previously been transmitted to the remote data storage location. In this way the same transmission policies/procedures as specified by the offering-specific customizations may be likewise used for the restoration procedures. The actual restoring of the documents may thus include transmitting the documents to the remote data storage location from the local data storage location through the communication system according to customizations therefore applicable to documents not having been previously transmitted from the local data storage location to the remote data storage location. Prior to any restoring operations, the documents may be enqueued within one or more queues at the local data storage location. In one embodiment, each of the queues is associated with a corresponding quality of service for document delivery to the remote data storage location.

In a further embodiment of the present invention, A method, one or more documents are enqueued, according to policies associated with an offering, for delivery to a first document endpoint; then sent, as specified by said policies, to the first document endpoint while copies of the documents marked so as to indicate such transmission are retained. Upon receipt of an indication to do so, the documents (i.e., the retained copies thereof) are sent, again as specified by the policies, to a second document endpoint, which may (but need not be) the same as the first document endpoint. Such document endpoints may be identified by uniform resource locators (URIs) included within the policies.

The copies of the documents may be retained in queues in which the original documents are originally enqueued. The enqueuing of the original documents may be performed so as to segregate those documents by quality of service of document delivery to the first document endpoint. Prior to enqueuing the documents, the policies described above may be obtained (e.g., in response to a request therefor) from a registry associated with the offering.

Still another embodiment of the present invention provides a system that includes a first module configured to format a document for transmission from a local document storage location to a first remote document endpoint according to first offering-specific criteria to produce a so-formatted document, and a second module communicatively coupled to receive the so-formatted document from the first module, the second module being configured to enqueue the so-formatted document prior to transmission according to second offering-specific criteria, transmit the so-formatted document to a first remote document endpoint while retaining a copy of the so-formatted document marked so as to indicate such transmission, and transmit, in accordance with an instruction to do so and according to the second offering-specific criteria, the copy of the so-formatted document to a second remote document endpoint. As before, the first remote document endpoint and the second remote document endpoint may (but need not) be the same document endpoint. In some cases, the second module may be configured to retain the copy of the document in a queue in which the original document was originally enqueued.

Of course other embodiments of the present invention, including software embodiments in which a computer-readable medium having stored thereon a set of computer-readable instructions to implement processes discussed herein are provided, are likewise contemplated and the above are merely examples of the present invention.

BRIEF DESCRIPTION OF THE DRAWINGS

The present invention is illustrated by way of example, and not limitation, in the figures of the accompanying drawings in which.

DETAILED DESCRIPTION

Figure 1:
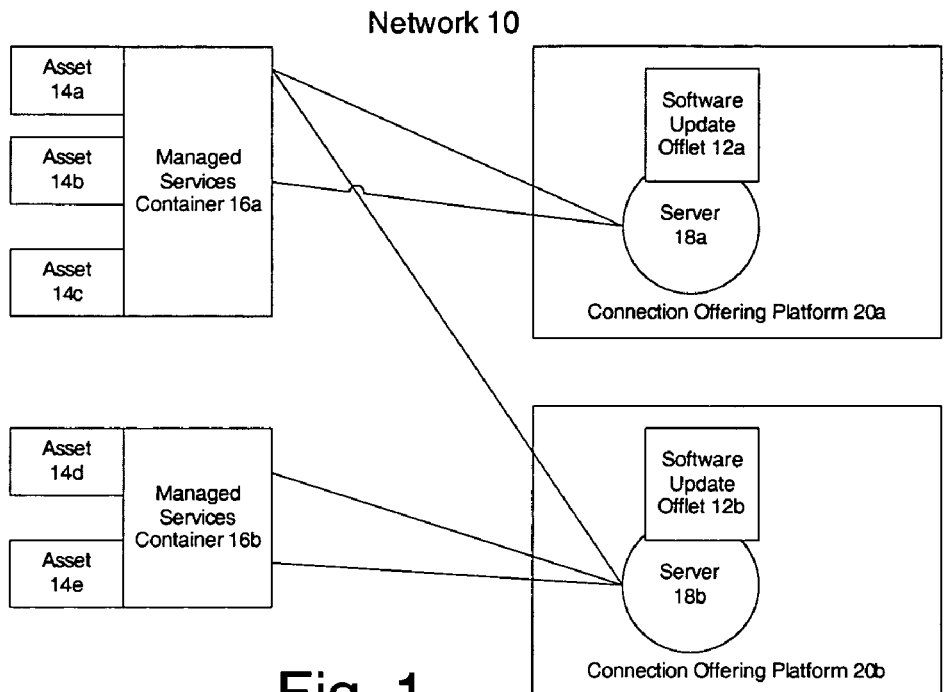
FIG. 1 illustrates an example of a network configured in accordance with an embodiment of the present invention including managed service containers (MSCs) and associated connection offering platforms (COPs)

Described herein are methods and systems for restoring documents and/or other electronic information at a remote location in the event of a loss of such information. By remote we mean a site or platform other than that at which an application program is executing, without regard to geographic location or separation distance. Hence, a remote site may be physically nearby the platform where the application program is running or it may be quite some distance away. Further, although the present invention will be discussed with reference to certain illustrated embodiments thereof, readers should remember that such illustrations and references are not intended to limit the more general scope and nature of the present invention, which is best understood by reference to the claims following this description.

Various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed (e.g., by a computer processor or other machine) in a sequence to accomplish a given purpose.

In view of the above, it should be appreciated that some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can also be implemented with apparatus to perform the operations described herein. These apparatus may be specially constructed for the required purposes, or may comprise one or more general-purpose computers, selectively activated or reconfigured by a computer program stored in or accessible by the computer(s). Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

In one embodiment, the present methods and systems are adapted for use within an environment in which "offerings" (i.e., application programs and the like) installed at computer systems/networks at one ore more user locations communicate with processes running on remote computer systems (e.g., servers or other systems as may be installed at data centers, service centers, etc.). Such an environment may be used, for example, to provide remote support for the offerings, allowing the users of the offerings to be freed from tasks such as installing periodic software updates and patches. Of course, many other examples of the use of such an environment exist and the examples presented herein are in no way meant to limit the more general applicability of the present invention. As will become apparent from the discussion below, the architecture of this environment includes both an infrastructure made up of common services (these may include, for example, communications, data management, data visualization, etc.) and a series of components called "offlets" that provide customized instances of these common services specific to/for an offering.

FIG. 1 illustrates these concepts and their relationship to one another in the context of a network 10. An offering describes the technology (e.g., software, hardware, etc.) required to provide a suite of services to an end user (i.e., assets employed by the user). The technology is broken into offlets 12a, 12b and a series of common services that are supported by a hardware and software infrastructure. Offlets are configured to take advantage of these common services and are themselves made up of a series of services, asset information and interaction logic that is otherwise not provided by the common services.

As the term is used herein, an asset 14a-14e can be any element (e.g., computer hardware, software, storage, a service processor, a mobile phone, etc.) that can interact with an offering; or, more generally, something the associated offering helps manage or provides some service to. An asset then can be hardware that is adapted to provide a service, an operating system running on the hardware, and/or an application program running on the operating system. The offerings collect information from and/or provide information to the assets via network 10. To support these activities, the network 10 includes a common communication architecture managed by a common software infrastructure; in particular, by instances of a managed services container (MSC) 16a, 16b. The MSC represents the software that can interact, either directly or via a proxy, with the one or more assets of interest.

Relationships between assets and offlets are flexible inasmuch as servers 18a, 18b hosting one or more offlets may be located anywhere and assets can be served by more than one offering through an offlet. Thus, the present communications architecture adopts a different model from that found in deployments where a large number of servers report back to a large data center. Such data centers are very expensive to create and to maintain, especially for offerings where a large number of assets are participating. By contrast, in the present scheme offerings are delivered from any number of different servers that can be distributed anywhere that is network accessible by the assets. No topological restrictions exist. The part of the software infrastructure that supports these sorts of deployments is called the connection offerings platform (COP) 20a, 20b. The COP manages the interfaces, provides the infrastructure and contains the common services that offlets need to operate within, and hosts the offlets that provide the business technology capabilities to fulfill the overall needs of the offerings.

Figure 2:
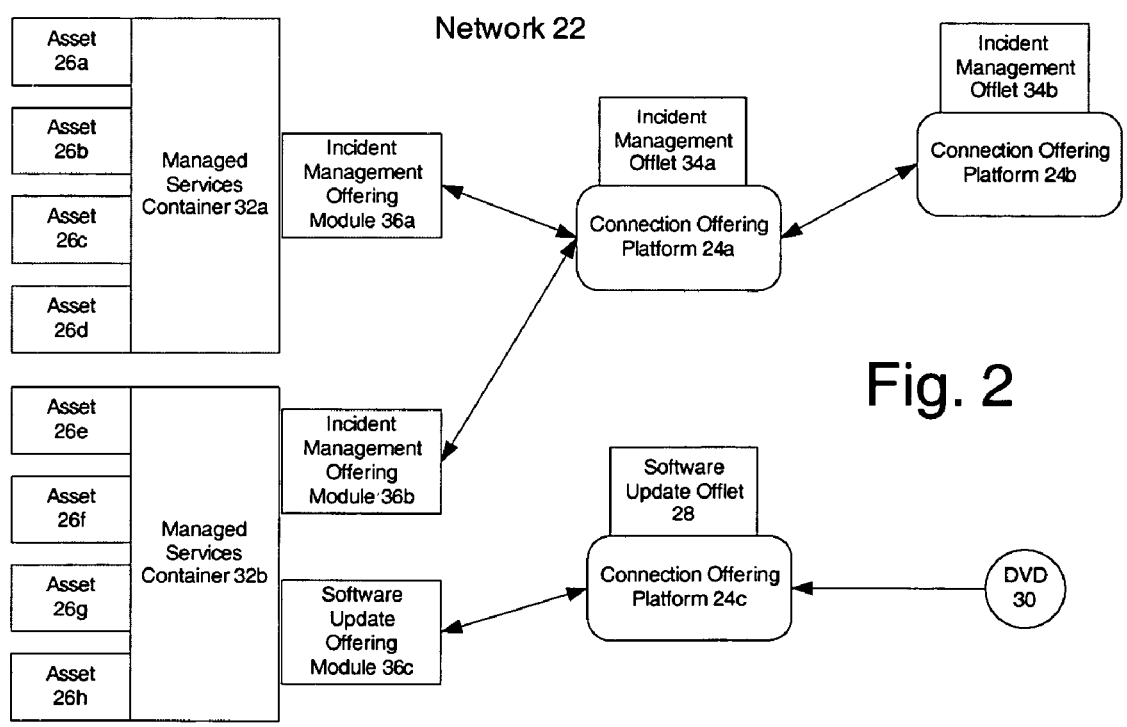
FIG. 2 illustrates in further detail relationships between MSCs and COPs in accordance with yet another embodiment of the present invention.

FIG. 2 shows an example of a network 22 of COPs 24a, 24b, 24c providing offerings used by a number of assets 26a-26h. In this example, three COPs are utilized to provide two offerings. The first offering, a software update with an associated software update offlet 28, is provided from a platform 24c residing within a local area network (e.g., the user's network). This platform 24c is disconnected from external networks and relies on the receipt of hard copy updates 30 (e.g., in the form of CD-ROMs, DVDs or other media) that contain new software from the service provider. These media contain content that can be loaded by the software update offlet 28 (and via one or more MSCs 32a, 32b) to ensure that the associated assets 26e-26h are maintained and up to date. In this mode the COP 24c is operating in a disconnected fashion.

The second offering, incident management, is supported by two offlets 34a, 34b. One offlet 34a runs on a COP 24a located at a level 1 service provider site, the other 24b in the main service provider's premises. Offlets can contain other offlets and in this case the overall incident management offlet contains two offlets. One, offlet 34a, provides automated incident management and analysis along with a basic knowledge base sufficient to facilitate first level support. If the incident cannot be resolved at this level, the incident is escalated by the offlet 34a to a second incident management offlet 34b, which contains a more detailed knowledge base so as to facilitate managing the incident to closure.

As shown, communication can be MSC-to-COP (e.g., to provide for the transmission of telemetry or the issuing of commands to an offlet for processing) and/or COP-to-COP (e.g., to support distributed offlet processing). Either or both of these forms of communication can be restricted to an internal network (or network of networks) or may operate across a wide area network or Internet.

Finally, FIG. 2 introduces the concept of offering modules 36a, 36b, 36c, which exist within the MSCs to support interaction between the offlets and the assets. The offering modules are designed to facilitate customizations of the common services (such as communication services, etc.) provided by the MSCs, for example so as to collect or filter information only relevant to particular assets and offerings.

Figure 3:
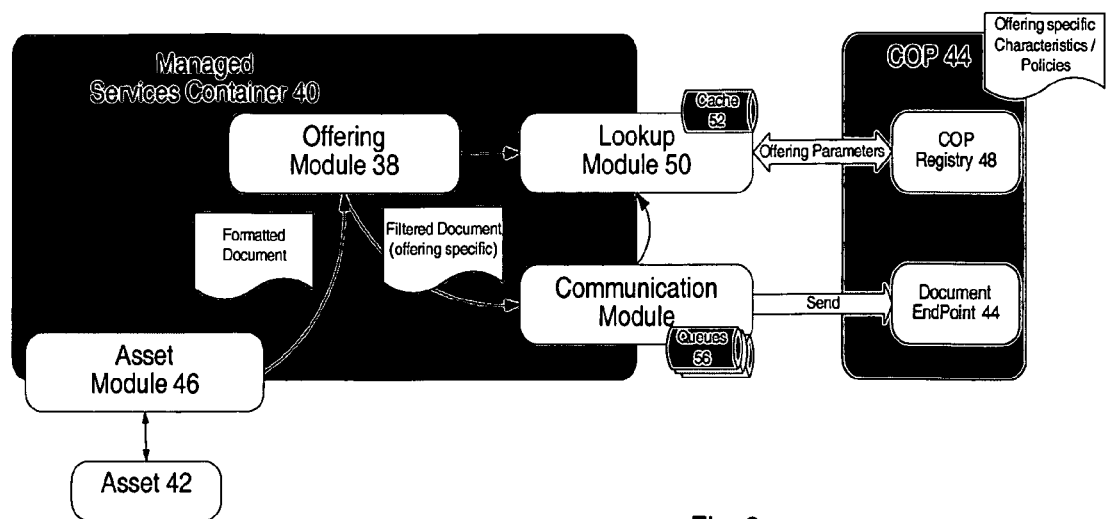
FIG. 3 illustrates modules involved in communications between the MSC and the COP in accordance with an embodiment of the present invention.

FIG. 3 illustrates in more detail the role of an offering module 38 within an MSC 40 and its various intercommunications with an asset 42 and a COP 44. As discussed earlier the MSC 40 provides certain common services to all assets, including the abstraction of the communications to/from the COP. Within the present network environment communications between the asset 42 and the COP 44 (i.e., the offlet hosted at the COP 44 and associated with the offering providing services to the asset) are based on a document model where each message is treated as a separate document (e.g., an extensible markup language (XML) form or other document). This document model allows for various customizations, such as communication quality of service, on an offering-by-offering basis. Individual offerings can thereby dictate the handling of their messages (e.g., for disaster recovery and other purposes) while still making use of a common communications infrastructure available to all offerings.

Recall that an asset 42 can be any combination of hardware and/or software. To provide a means of integrating and managing such assets (which by their nature can be quite diverse), asset modules 46 are provided. Given the diversity of assets available, different asset modules for each type of asset monitored or acted upon by offerings provisioned to the MSC 40 may be used to expose the assets' native programming/communication environment. Stated differently, asset modules 46 provide a mapping between that which an asset's native agentry exposes and a common information model (e.g., the document model described above) used by the MSC 40. Communication between asset modules and their associated assets can take the form of simple network management protocol (SNMP) or intelligent platform management interface (IPMI) communication, system calls, "command scrapings", etc.

Asset module 46 thus interacts with the asset 42 and allows for protocol normalization (i.e., the asset module communicates with the agent using the agent's native protocol or native application programming interface (API) while providing a common interface inbound into the MSC) and data model normalization (i.e., the asset module translates the asset's native data model into the common information model used within the network). Asset modules are configured based on the needs of the associated offlet(s) and abstract the protocol/model/control variances in the assets.

The documents (i.e., messages) provided by the asset module 46 are received in the MSC 40 by the offering module 38. Such offering modules plug directly into the MSC 40 through one or more exposed APIs and access the asset module(s) 46 as needed through the normalized interface that is exposed to the MSC. Examples of these modules might include modules for asset management, software updating, hardware fault reporting, etc. Each offering module 38 is thus provisioned to support an associated offering hosted on one or more connected COPs 44.

Upon receipt of a document from the asset module 46, the offering module 38 filters and/or formats the document according to the associated offering-specific rules for such items. To do so, the offering module retrieves the offering rule parameters from a COP registry 48 maintained by the COP 44 hosting the associated offlet. The COP registry is discussed further below. This retrieval may be done via a lookup module 50, which may include a local cache 52 used to store locally copies of the offering parameters (i.e., configuration information) so as to minimize the need for communications between the offering module 38 and the COP 44. The offering parameters returned to the offering module 38 may include the destination for the document (e.g., a URI of a data store for the message at the COP 44 or elsewhere), the quality of service for the delivery of the document, filtering patterns to employ (e.g., XML path language expressions to specify the locations of structures and data within an XML document), and/or a method to use in sending the document (e.g., simple object access protocol (SOAP)/Java messaging service (JMS), representational state transfer (REST), hypertext transfer protocol (HTTP), etc.).

The offering-specific rules obtained from the COP registry 48 or lookup module cache 52 essentially customize the general communications infrastructure provided by the MSC 40. Based on these rules, the offering module 38 prepares and formats the document received from the asset module 46 and passes the (now offering-specific) formatted document to the communication module 54 for delivery to the document endpoint 58 at COP 44 (or elsewhere as specified by the URI returned from the registry 48). Communication module 56 may include one or more queues for storing such documents prior to transmission to the document endpoint 58, for example as a means for providing various document delivery quality of service (QoS). Documents are transmitted using the method and QoS defined by the offering.

From the above it should be apparent that COP 44 acts in various capacities, for example as a data aggregation point, a services aggregation point and a knowledge delivery vehicle. A COP's role in the overall network is defined by the offerings that it supports, its relationship with other COPs and its relationships with its MSCs. It is important to note it is the offering that determines the platform's behavior, the data transmission and the knowledge application. The COP simply provides the common features that allow this to happen.

The COP registry 48 is a container that persistently stores configuration and topology information for an instance of the COP to operate in the network. To reduce complexity in management and administration of the network, everything a COP needs to operate with its associated assets/MSCs, provisioned offerings, and even other COPs may be stored in the registry, for example:
  a) Topology information for assets, MSCs and other COPs.
  b) Appropriate information to create communication endpoints.
  c) A local offering registry (i.e., a registry of all of the offerings that are contained within the COP that the registry is a part of and which may include the name and a description of the offerings, URIs for MSCs and COPs associated with the offerings and/or pointing to any software needed by those MSCs/COPs, configuration options for the offerings, and software bundles for the offerings (if appropriate)). The local offering registry is the data store of record for each COP that represents the information pertinent to accessing, activating and provisioning offerings on the COP and the associated MSCs.
  d) Connection mode and connection quality of service (QoS) properties for communicating with MSCs and COPs.
  e) Privacy policies associated with offerings.
  f) User authentication/authorization information, personalization information and/or customization information.

Information exchange between the COP 44 and MSC 40 is bidirectional, but the communications will always be initiated by the MSC 40. As indicated above, such communications are initiated by the MSC's lookup module 50, seeking, for example, an address (e.g., a URI) of a document end point 58 from the COP registry 48 for the specific type of document to be sent. Once the address of the end point is known, the MSC 40 can send the document to that address. An inbound message broker (not shown) at the COP 44 may receive and dispatch the document to an appropriate message handler, which may then process and parse the document and trigger the appropriate business process.

The reverse data flow from the COP 44 to the MSC 40 is similar. When an offering needs to send information back to or execute a command on a specific MSC, it will perform a lookup to retrieve the specific address for the MSC endpoint. The message is then dispatched to an appropriate outbound message broker for eventual retrieval by the MSC 40 (e.g., through an intermittent polling mechanism). The actual data flow may depend on the messaging system used to implement the outbound message broker and/or the type of connection that exists between the MSC 40 and the COP 44. All of these communications may be managed asynchronously, such that once a message is committed to an appropriate message broker the sender can continue processing other documents.

Figure 4:
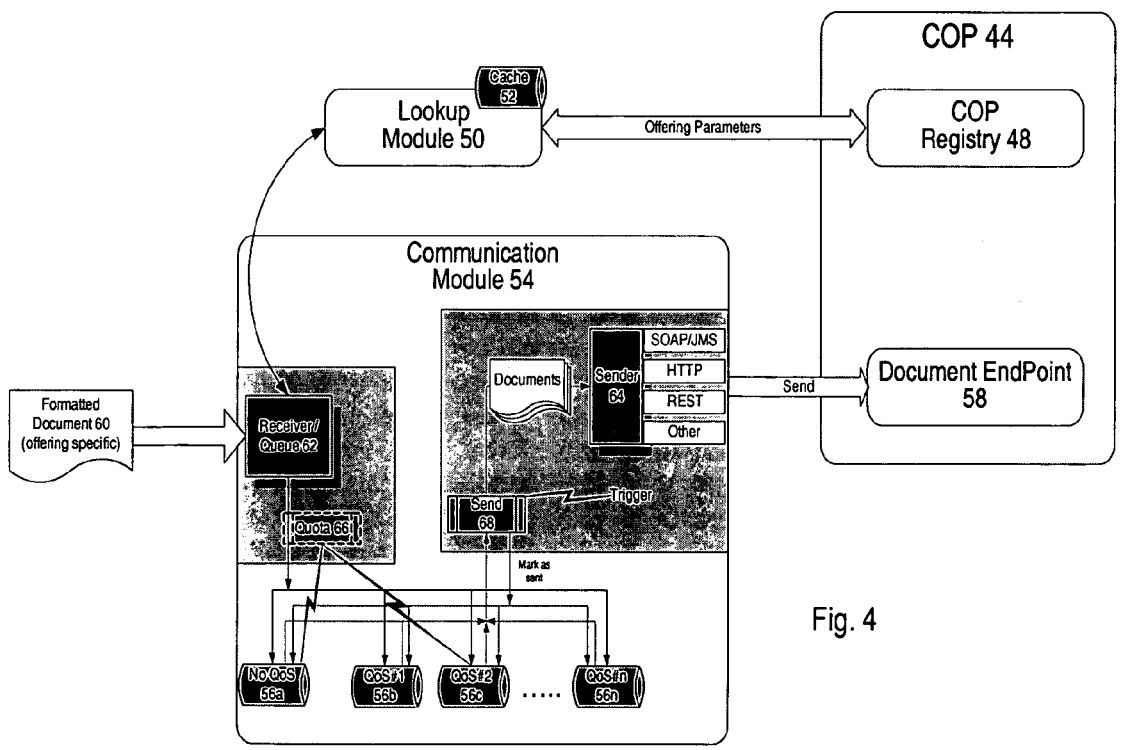
FIG. 4 illustrates in further detail aspects of the communication modules shown in FIG. 3.

FIG. 4 illustrates communication module 54 in further detail. The offering-specific formatted document 60 is received in communication module 54 at a receive queue 62. It is dispatched from the receive queue to an outbound message queue 56a-56n according to the QoS parameters specified by the offering. In one embodiment, one of these outbound message queues may be used for documents for which no QoS is specified. In cases where a particular queue's quota of messages has been reached, or will be reached by the addition of a new document, queue cleanup may be performed prior to enqueuing the new document. This queue cleanup procedure may be offering-specific as directed by queue policies specified by offering parameters obtained from the COP registry 48. In one embodiment of the present invention the queue quota policies are described in XML documents defining two characteristics of the queues: the first associated with the size of the queues (which parameter will trigger the cleanup), the second describing the method(s) used to perform the cleanup when it is needed (e.g., remove oldest messages first, remove largest messages first, remove low priority messages first, etc.). The specified method may be called when either the queue-specific policy defining its size has triggered it, or when a more generic event does so.

The document queues 56 are specific per offering and per QoS/transport/endpoint. That is, different queues may exist for documents having different QoS transmission parameters, different transport mechanisms and/or different endpoints. Documents are transmitted out of the queues 56 according to triggers, which may be event driven or time driven (or both), under offering-specific policy control. Outbound documents are passed to a sender module 64 appropriate for the type of transport to be used and the sender module transmits the documents to the associated endpoint 58.

To summarize then, before inserting a new document 60 in any queue, the communication module 62 will call a queue quota manager 66. The quota manager 66 will, for each queue or for the document's targeted queue and based on the policies associated with the subject queue(s), determine whether or not the subject queue(s) has/have reached its/their limits. If so, the quota manager will call an associated cleanup procedure. The order of how the queues and quotas are checked is defined either on a per-queue based limit, or by a global queue limit setting associated with an ordering mechanism to call, in order, the cleanup processes. This global mechanism will decide in which order the queues will be cleaned up when the global limit is reached. One the clean-up procedures have been completed (if they were in fact performed), then for a document 63 for which the COP registry lookup has returned a quality of service, that document is queued in the associated queue for the specific offering and QoS. If such a queue does not yet exist within the communication module 54, the communication module 54 will create it. For a document for which the COP registry lookup has returned no QoS, the document will be stored with like documents (i.e., those with no associated QoS) in a single queue. Documents are transmitted out of their respective queues according to triggers (event-driven or otherwise).

This communication mechanism provides several advantages, among them a process for disaster recovery using optional archive queues. As indicated above, when the communication module 54 receives documents to be sent, the first thing it will do is to query the COP registry 48 associated with the subject offering and fetch the various offering characteristics. Among these characteristics will be certain document sending policies. In one embodiment of the present invention, such policies may be described in one or more XML documents defining how to process the enqueued documents to be sent. Associated with such offering-defined policies, a user may locally define whether or not to use a disaster recovery archive at the MSC 40, and, if so, how long a history should be kept (e.g., by number of messages, days of storage, etc.). Such an archive may be implemented as long term (e.g., as defined by the archive policy) storage in one or more queues 56a-56n. In practice, the queues may be portions of a storage device accessible by MSC 40.

When the communication module 54 is triggered to send documents, the send module 68 first selects a queue, based on its QoS, and send module 68 calls the associated queue policy to determine which enqueued documents to send, then sends those selected documents. Afterwards, the successfully transmitted documents are marked as sent. Consider now that if disaster recovery is desired it may be facilitated by marking the queued sent messages as un-sent, and letting the above-described sending process operate to repopulate the document endpoint 58 at COP 44 (or another designated location according to updated offering configuration parameters)

Stated differently, assume that the above-described document sending process has been employed and that documents sent by communication module 54 are transmitted to an endpoint 58. Further assume that for some reason (e.g., power failure, etc.) the document endpoint 58 has lost some or all of its saved documents. So long as these "lost" documents are still enqueued at communication module 54 (e.g., as sent documents in accordance with an offering-specific disaster recovery policy), they can be resent to the document endpoint 58 (or, indeed, any other location as specified in offering-specific parameters retrieved during a registry lookup) by having the communication module 54 mark the documents as unsent and then allowing the document transmission policies to operate normally.

In various embodiments of the present invention, different policies may be used to specify which documents to archive for disaster recovery purposes (e.g., based on priority, type of document, etc.) and/or the order in which to resend such documents to endpoint 58 (or elsewhere) in the event recovery is needed. Further, the mechanism to elect which documents to send and the activation of the disaster recovery plan itself may force modifications to one or more quota policies for one or more queues, for example by adding the automatic cleanup of older archived messages. In some cases, quota policies may be applied indiscriminately to all queued messages (whether previously sent or not). Alternatively, different policies may apply to archived documents versus non-archived documents. Such differing policies will have varying impacts. Finally, while it may be readily apparent to the careful reader, it should be noted that documents queued with no QoS need not be handled by the disaster recovery mechanism, as no QoS is attached with them and so no guarantees as to delivery are impacted.

The present invention thus defers the costs of a disaster recovery mechanism to the client and enables a controlled recovery of data over time. Further, because offerings can, at anytime, modify their sending/disaster recovery policies and have such modifications be reflected in near real time in all clients, the present invention provides a much more flexible disaster recovery mechanism than conventional approaches such as tape back-ups of data centers, etc.

A few examples may help the reader to appreciate some of the advantages afforded by the above-described methods:

a) First, consider a scheme wherein an offering is configured to collect asset configuration changes based on a weekly baseline and daily differences therefrom. For such offering, the disaster recovery sending policies may be specified such that the baseline information is sent first, from the most recent to the oldest still queued, and thereafter the intermediate difference data collected each week, for example in reverse order for each such week, is sent. Such a document delivery policy will result in the baseline information being updated with the most recent changes (with a weekly frequency), going back in time, without flooding the data center with a huge amount of data all at once.

b) Second, consider an offering configured to collect events and alarms. Here, a disaster recovery policy may be specified to send first the documents related to the newest alarms which may have generated an action or remediation. Documents describing informational events or older alarm may be sent at a later time. Again, flooding of a data center (e.g., by tape backup) is prevented and the most relevant information is delivered in a timely fashion.

c) Third, consider an offering configured to collect trend data. Here, the disaster recovery policy may be as simple as sending previously queued documents in reverse chronological order. However a more interesting policy may be devised to take into account the queue clean up procedures to be employed when the disaster recovery policy is enabled. For instance, when such a policy is running and previously sent documents are being archived, eventually one or more queues will reach their quota capacities and will need to be cleaned. If a simple clean-up policy involving deletion of the oldest documents first were used, then any disaster recovery policy would be somewhat useless inasmuch as only more recent documents would remain for repopulating a document endpoint and such recent documents may not accurately reflect longer term trends (i.e., the very thing the offering was designed to capture). So, a more intelligent clean-up policy that recognizes the disaster recovery aspect of the present invention may be implemented such that when a queue quota is reached documents are deleted from the queue at random and such deletions occur over the entire queue. This will ensure that the information lost will be randomly (or, more probably, pseudo-randomly) spread over the entire dataset to be sent in the event of a repopulation of the document endpoint, possibly better preserving the long term trend information that might otherwise be lost.

Thus methods and systems for restoring documents and/or other electronic information at a remote location in the event of a loss of such information have been described. Although discussed with reference to some specific examples, however, the scope of the invention should only be measured in terms of the claims, which follow.

What is claimed is:

1. A method comprising:
   identifying, using a processor and according to a policy associated with an offering, a queue for storing a document for delivery to a first document endpoint;

detecting, using the processor, a storage quota of the queue is reached;

deleting, using the processor and in response to detecting the storage quota of the queue is reached, a plurality of documents at random positions within the queue;

enqueuing, using the processor and after deleting the plurality of documents, the document in the queue;

transmitting, using the processor and as specified by the policy, the document to the first document endpoint and retaining a copy of the document;

receiving a confirmation of successful transmission of the document to the first document endpoint;

marking, using the processor and in response to the confirmation, the copy of the document as sent to indicate transmission of the document;

receiving, after receiving the confirmation, an indication of a failure at the first document endpoint;

marking, using the processor and in response to the indication, the copy of the document as unsent after the document is marked as sent, wherein marking the copy of the document as unsent enables retransmission of the document according to the policy; and transmitting, as specified by the policy and using the processor, the copy of the document to a second document endpoint after marking the copy of the document as unsent.

2. The method of claim 1, wherein the first document storage endpoint and the second document storage endpoint comprise the same document endpoint.

3. The method of claim 1, wherein at least one selected from a group consisting of the first document endpoint and the second document endpoint is identified by a uniform resource locator (URI) included within the policy.

4. The method of claim 1, further comprising:
prior to enqueuing the document, receiving the policy from a registry associated with the offering.

5. A system, comprising:
a processor;
a formatting module, executing on the processor, configured to format a document for transmission from a local document storage location to a first remote document endpoint to produce a so-formatted document; and
a communication module, executing on the processor, communicatively coupled to receive the so-formatted document from the formatting module, the communication module configured to:
identify, according to a policy associated with an offering, a queue for storing the so-formatted document for delivery to the first remote document endpoint;
detect a storage quota of the queue is reached;
delete, in response to detecting the storage quota of the queue is reached, a plurality of documents at random positions within the queue;
enqueue, after deleting the plurality of documents, the so-formatted document in the queue;
transmit the so-formatted document to the first remote document endpoint and retain a copy of the so-formatted document;
receive a confirmation of successful transmission of the so-formatted document to the first document endpoint;
mark, in response to the confirmation, the copy of the so-formatted document as sent to indicate transmission of the so-formatted document;
receive, after receiving the confirmation, an indication of a failure at the first remote document endpoint;
mark, in response to the indication, the copy of the so-formatted document as unsent after the copy is marked as sent, wherein the copy of the so-formatted document is marked as unsent to enable retransmission of the so-formatted document according to the policy; and
transmit, as specified by the policy, the copy of the so-formatted document to a second remote document endpoint.

6. The system of claim 5, wherein the first remote document endpoint and the second remote document endpoint comprise the same document endpoint.

7. A computer-readable storage medium having stored thereon a set of computer-readable instructions, which when executed by a computer processor, cause the computer processor to:
identify, according to a policy associated with an offering, a queue for storing a document for delivery to a first document endpoint;
detect a storage quota of the queue is reached;
delete, in response to detecting the storage quota of the queue is reached, a plurality of documents at random positions within the queue;
enqueue, after deleting the plurality of documents, the document in the queue;
transmit, as specified by the policy, the document to the first document endpoint and retain a copy of the document;
receive a confirmation of successful transmission of the document to the first document endpoint;
mark, in response to the confirmation, the copy of the document as sent to indicate transmission of the document;
receive, after the confirmation is received, an indication of a failure at the first document endpoint;
mark, in response to the indication, the copy of the document as unsent after the copy is marked as sent, wherein the copy of the document is marked as unsent to enable retransmission of the document according to the policy; and
transmit, as specified by the policy, the copy to a second document endpoint.

8. The computer-readable storage medium of claim 7, wherein the computer-readable instructions further cause the computer processor to retrieve the policy from a registry associated with the offering prior to enqueuing the document.

9. The computer-readable storage medium of claim 7, wherein the copy of the document is retained in the queue.

10. The computer-readable storage medium of claim 7, wherein the computer-readable instructions further cause the computer processor to enqueue the document according to quality of service of document delivery to the first document endpoint.

11. The method of claim 1, wherein the copy of the document is retained in the queue.

12. The method of claim 11, wherein enqueuing is performed to segregate the document by quality of service of document delivery to the first document endpoint.

13. The system of claim 5, wherein the communication module is configured to retain the copy of the so-formatted document in the queue.

* * * * *